US006361072B1

(12) United States Patent
Barnes

(10) Patent No.: US 6,361,072 B1
(45) Date of Patent: *Mar. 26, 2002

(54) AIR BAG CONTOURED FOR SAFETY

(76) Inventor: Bertron O. Barnes, General Delivery, Carmel, CA (US) 93921

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/568,685

(22) Filed: May 11, 2000

(51) Int. Cl.$^7$ ............................................... B60R 21/16
(52) U.S. Cl. ................................ 280/743.1; 280/728.1; 280/729; 280/733; 280/743.2
(58) Field of Search ........................... 280/728.1, 743.1, 280/729, 733, 743.2

(56) References Cited

U.S. PATENT DOCUMENTS

| | | | | |
|---|---|---|---|---|
| 3,879,056 A | * | 4/1975 | Kawashima et al. | 280/743.2 |
| 4,449,728 A | * | 5/1984 | Pilatzki | 280/743.2 X |
| 4,934,734 A | * | 6/1990 | Takata | 280/743.2 |
| 4,966,389 A | * | 10/1990 | Takada | 280/743.2 X |
| 5,280,953 A | * | 1/1994 | Wolanin et al. | 280/743.2 X |
| 5,350,188 A | * | 9/1994 | Sato | 280/743.2 |
| 5,358,273 A | * | 10/1994 | Onishi et al. | 280/743.2 |
| 5,642,905 A | * | 7/1997 | Honda | 280/743.2 X |
| 5,716,095 A | | 2/1998 | Lopez | 297/184.13 |
| 5,884,939 A | | 3/1999 | Yamaji | 280/743.1 |
| 5,887,894 A | * | 3/1999 | Castagner et al. | 280/743.2 X |
| 5,895,092 A | | 4/1999 | Fischer | 297/487 |
| 5,924,726 A | | 7/1999 | Pan | 280/733 |
| 5,931,498 A | | 8/1999 | Keshavary | 280/743.1 |
| 6,059,312 A | * | 5/2000 | Staub et al. | 280/743.2 X |

FOREIGN PATENT DOCUMENTS

| | | | | |
|---|---|---|---|---|
| JP | 0037058 | * | 2/1990 | 280/743.2 |
| JP | 0074439 | * | 3/1990 | |
| JP | 0197255 | * | 8/1991 | 280/743.2 X |
| JP | 403292237 | * | 12/1991 | 280/743.2 X |
| JP | 404176751 | * | 6/1992 | 280/743.2 X |
| JP | 406001188 | * | 1/1994 | 280/743.2 |
| JP | 406064490 | * | 3/1994 | 280/743.2 |

* cited by examiner

Primary Examiner—Lanna Mai
Assistant Examiner—Toan To
(74) Attorney, Agent, or Firm—Robert Samuel Smith

(57) ABSTRACT

An air bag whose envelope is a front panel and a rear panel joined around a common periphery and having a tether having one edge joined to an inside surface of the front panel and another edge joined to the inside surface of the rear surface near the entry port. The tether has two members, an elastic member that is shorter than an inelastic member in its unstretched state. The elastic member controls the rate of inflation of the air cushion thereby lessening the chance of injury due to the sudden inflation of the air bag. The inelastic member controls the shape of the air cushion to accommodate the face and head of the passenger.

6 Claims, 1 Drawing Sheet

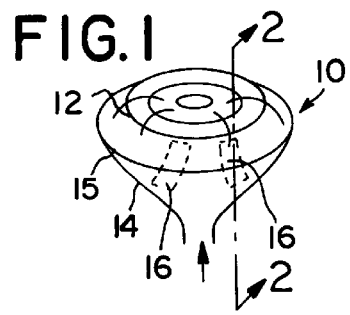
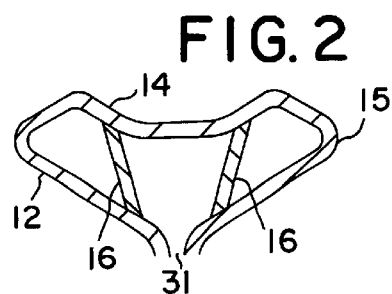
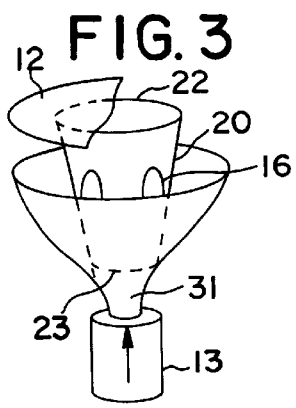
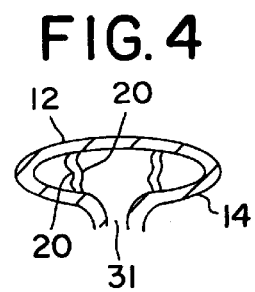
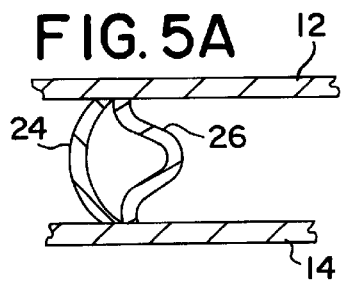
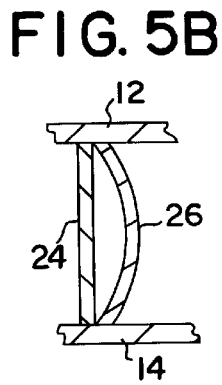
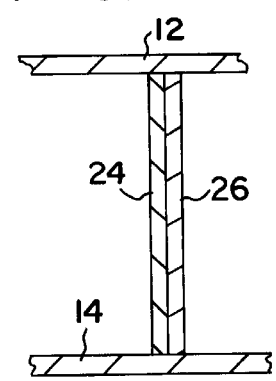
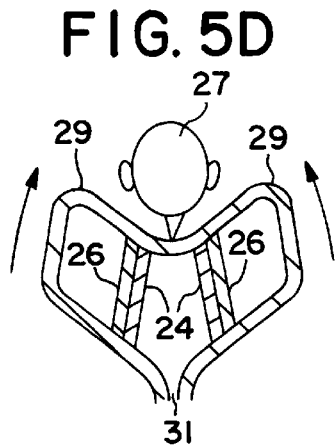
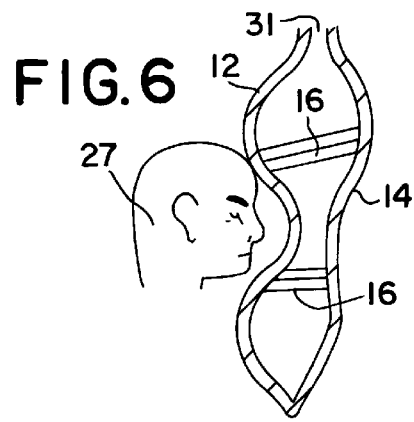

AIR BAG CONTOURED FOR SAFETY

FIELD OF THE INVENTION

This invention relates to air bags to prevent injuries from crashes to passengers, particularly children, riding in automobiles.

BACKGROUND AND INFORMATION DISCLOSURE

Air bags in vehicles that expand suddenly in the space between the dash board and passenger when a crash occurs have been shown to be an important means for preventing many deaths or injuries since their adoption by the automobile industry.

An ambiguity exists however in the operation of the bag which, on the one hand, requires great force by the expanding gas in order for the bag to expand very quickly and immobilize the passenger during the split second after the crash, but the passenger must not be injured by the force driving the rapidly expanding bag.

The consequence of this ambiguity has been that, although many thousands of drivers and passengers have been saved from injury and death by deployment of air bags, some passengers and especially children, have been killed when these bags have been deployed.

A number of disclosures have appeared related to the various designs of air bags intended to address the problem of air bag design especially devoted to the protection of children.

For example, U.S. Pat. No. 57168995 to Lopez discloses a child's seat for an automobile in which a safety shield attached to the seat is positionable in front of the child to protect against the force of the suddenly expanding bag.

U.S. Pat. No. 5,884,939 to Yamaji discloses an air bag having a diffuser that controls rate of expansion of the bag.

U.S. Pat. No. 5,895,092 to Fischer discloses a child's car seat with an air bag protection bar.

U.S. Pat. No. 5,924,726 to Pan discloses an air bag package designed in combination with a safety belt.

U. S. Pat. No. 5,931,498 to Keshavaraj discloses an inflatable air bag comprising two sections. One section is constructed with a pyramidal panel and the other section is constructed with a rectangular panel. The sections are joined and configured to conform to the shape of the dash board.

U.S. Pat. No. 5,957,485 to Hirai discloses an air bag structure including an outer bag having an internal cavity and an inner bag disposed in the cavity.

The problem with these examples of the prior art is that, when deployed and in use for their intended purpose, they over extend the safe distance for contact with the human face and body with a force that threatens the safety and life of the individual it is intended to protect. None of these disclosures accommodate the condition where the bag must protect various parts of the anatomy, each having its own requirements for protection in terms of the distribution of mass of the body v.s restraining force of the bag.

SUMMARY OF THE INVENTION

It is an object of this invention to provide an air bag whose dynamic action in terms of force and rate of displacement vary in various parts of the bag in order to accommodate parts of the passengers body that come in contact with the bag.

It is an object that the bag be adapted to the protection of children.

This invention is directed toward an air bag having an internal checkrein restraining construction that shortens the extent of the forward movement of the bag the air bag is deployed by a crash. The check rein construction comprises (in one embodiment) a front panel and rear panel, and are joined round their common periphery. The panels lay against one another when the bag is fully deflated. A tether inside the bag has one edge secured to an inside surface of the front panel and an opposite edge secured to the inside surface of the rear panel.

When fully inflated, the air bag of this invention assumes a bulbous shape with a concavity in its center so that the air bag "Wraps partially around the head and body as the air bag is deployed. The shape of the inflated bag including the concavity is selected according to the shape of the body or object (e.g., a small child) it is intended to protect.

In one embodiment, the tether has an elastic component that controls not only the rate and extent of expansion of the central area of the bag facing the face of the user, but also the rate of expansion of the peripheral areas of the bag.

The various features, aspects and advantages of the present invention will become better understood with regard to the following description, appended claims, and accompanying drawings, where

BRIEF DESCRIPTION OF THE DRAWINGS

FIG. 1 is a perspective assembly view of the air bag.

FIG. 2 is a sectional view of FIG. 1.;

FIG. 3 is a view with the top panel removed.

FIG. 4 is a sectional view of a partially inflated air bag of this invention.

FIGS. 5A–D illustrate action of the composite tether.

FIG. 6 shows an embodiment featuring vertical deployment of the bag.

DISCUSSION OF EXAMPLES OF THE INVENTION

Turning now to a discussion of the drawings, FIG. 1 shows a perspective assembly view of the inflated air bag of this invention and FIG. 2 is a sectional view of FIG. 1. There are shown an envelope 10 having an inside containing a tether 16. The envelope comprises a rear panel 12 joined to a front panel 14 around a common periphery 15. The tether 16 is shown which in the example of FIG. 1 is a pair of straps 16 shown in phantom in fig,1. Each strap has one end secured to the inside surface of the rear panel 12 and another end secured to the inside surface of the front panel. 14.

FIG. 3 is a cutaway perspective view (the front panel is cut away) showing another embodiment in which the tether is a disk 20 of material, sewn around its outer boundary 22 to the front panel,14 (front panel 14 is partially cutaway in FIG. 3) and around its inner boundary 23 to the rear panel 12. The tether is shown as a cone 20 in FIG. 3 because the bag has been inflated however, when the bag is deflated, the tether will be flat inside the bag. A plurality of openings 11 is shown in the tether 20.

The gas is generated by an inflater 13 and admitted into the bag through the central opening in the disk and rear panel. Inflater technology for generating gas under pressure is well known in the art of safety air bags for automobiles.

FIG. 4 is a sectional view showing the bag partially deflated and the tether 20 partially folded.

FIGS. 5A–D are sectional views illustrating a construction of the tether, applicable to either a strap, disk or other configuration of the tether for controlling the rate of expansion of one area of the Air bag (the center) relative to another area of the air bag. The tether has an elastic member 24 and an inelastic member 26.

In the context of this specification, the term "extended" and "extending" will be applied to both members when the ends of the respective members are being separated. The elastic member will be said to be "fully extended" when the ends of the elastic member are separated by the maximum distance before stretching occurs. The term stretched will describe the elastic member when the ends of the elastic member have been displaced by a distance greater than the fully extended condition.

FIG. 5A shows the tether in a condition when the air bag is partially inflated. The over all length of the inelastic member 26 is greater than the length of the elastic member 24.

As gas enters the bag, FIG. 5B shows the elastic member 24 extended to its full unstretched length. The inelastic member 26 has not been fully extended. At this point, the surface of the bag has approached the face of the passenger at a relatively unlimited speed.

As shown in FIG. 5C, continued inflation causes the elastic component 24 to stretch to a full limit where the inelastic component reaches its fullest extension. During this time of stretching the elastic component 24, the elastic component slows down rate of expansion of the central portion of the bag thereby reducing the eventual force of impact against the face of the passenger and increasing the rate at which the outside area of the air bag wraps around the body and head of the passenger.

As shown in FIG. 5D, when the inelastic component 26 reaches the limit of its extension, the only change in shape due to the expansion of the air bag will be the continued extension and wrapping around the head 27 and body of the outside regions 29 of the bag. There will be no force against the face of the passenger except the impulse generated by the momentum change of the head and this impulse will be dampened by the cushion properties of the air bag.

The principles of bag construction of this invention may be applied to a system that relies on horizontal deployment of the bag such as when the folded bag is stored adjacent the vizor overhead the passenger or deployed horizontally such as when the bag is stored in the steering column or dashboard of the car.

For example, FIGS. 1–5 show air bag configured for horizontal deployment. The gas inlet 31 is in the center of the bag and gas enters through an aperture in the center of the bag as discussed above.

FIGS. 6 is a sectional view showing the bag configured for vertical deployment in which case the bag is suspended and gas is admitted at the periphery of the panels but the tether is still located in the center of the panels as discussed above.

While the bag has been described above as an envelope comprising a front panel and rear panel joined at a common periphery with the tether attached to the approximate center of the panels, it will be understood that that the envelope may be constructed as a single integral piece such as a balloon.

While the drawings and discussion above have shown a elastic member distinct from an inelastic member, it should be understood the the equivalent of a two member (elastic and inelastic) comprises a fabric composed of elastic thread and inelastic thread where the inelastic thread is longer than the elastic thread.

There has been described an air bag that features shape and dynamic characteristics conducive to the protection of the passenger during the crash of a vehicle in which the passenger is riding.

Variations and modifications and modifications of the invention may be contemplated which are within the scope of the invention.

For example, in place of a disk or strap, the tether may be a rectangle and the panels of the air bag may be rectangular or other convenient shape depending on the requirement of the outer edges of the expanded bag to conform to the conformation of the door, dash board and/or ceiling of the interior of the automobile.

The shape of the air bag when expanded determined by the construction of the tether, may have any one of a number of shapes depending on the object to be protected, particularly children, adults or objects of value.

In one embodiment, the principles of the bag construction is applied to a bag designed specifically for vertical or horizontal deployment.

In one embodiment, the elastic part of the tether is any one of a number of elastomeric materials such as rubber, neoprene, or urethane.

In one embodiment, the inelastic component of the tether is any one of a number of materials including cotton or other vegetable fiber material impregnated with a coating to render the bag air tight, leather or plastic sheet such as acetate, vinyl, nylon, polyethylene, etc. or combinations thereof.

In view of these and other considerations prompted by reading the specification and studying the drawings that are within the scope of the invention, it is therefore wished to define the scope of this invention by the appended claims.

What is claimed is:

1. An inflatable air bag attachable to an inflater for deployment in an automobile for the protection of passengers, said bag comprising:

an inflatable envelope having an entry port for admitting gas.

a tether means inside said envelope for controlling expansion of said envelope having an elastic member and an inelastic member;

said elastic member and inelastic member having a common end secured to an inside surface of said envelope in one area and another common end secured to said inside surface of said envelope in another area;

said elastic member having a length that is shorter than a length of said inelastic member providing that when said air bag is deflated, both said inelastic and elastic members are unextended, and when gas initially enters said bag, said elastic member first extends until said elastic member is fully extended, and, as said bag continues to inflate, said elastic member stretches and said inelastic member extends until said inelastic member is fully extended whereby said one area of said bag ceases to unfold while areas of said air bag distal from said another area continue to unfold providing that a concavity is formed in said envelope.

2. The air bag of claim 1 comprising:

said tether means being at least one pair of straps;

one strap of each said pair of straps being elastic;

another strap of each said pair of straps being inelastic;

said inelastic strap of each pair of said at least one pair of straps being longer than said elastic strap of said each pair when said elastic strap is unstretched;

said inelastic strap and said elastic strap of each pair of at least one pair of straps having one common end joined at a first location in said one area and another common end joined at said second location in said another area.

3. The air bag of claim 2 wherein said inelastic strap is made of material selected from a group of materials consisting of vegetable fiber, cloth and a plastic sheet and said elastic strap is made of material selected from a group of materials consisting of rubber, neoprene and urethane.

4. The inflatable air bag of claim 1 wherein:

said envelope is a flexible rear panel and a flexible front panel joined together around a common periphery;

said entry port is located about in a center of said rear panel;

said tether is at least one strap, each said at least one strap having one end joined to an inside surface of said front panel and another end joined to an inside surface of said rear panel proximal to said entry port;

each said at least one strap having a length selected to provide that when said envelope is inflated through said entry port, said strap limits expansion of said envelope whereby a concavity centrally located in a center of said front panel is formed.

5. The inflatable air bag of claim 1 wherein:

said envelope is a flexible rear panel and a flexible front panel joined together around a common periphery;

said entry port is located about in a center of said rear panel;

said tether is a tether panel of flexible material having an outer boundary and a centrally located aperture defined by an inner boundary;

said outer boundary attached to an inside surface of said front panel and said inner boundary joined to an inside surface of said rear panel and surrounding and proximal to said entrance port;

said tether panel having a plurality of openings permitting gas to enter every region inside said envelope, said tether panel having a size selected to provide that when said envelope is inflated through said entry port, a concavity centrally located in a center of said front panel is formed.

6. The inflatable air bag of claim 1 wherein said inflater is installable in one of a steering column and a glove compartment of said automobile and said envelope is adapted to provide that, when said air bag is fully inflated, a length of an edge of said periphery of said envelope lies substantially against an inside surface of a door of said automobile and a front surface of said envelope is forced against said passenger sitting in said car adjacent said door.

\* \* \* \* \*